Aug. 10, 1937.  R. E. LIBER  2,089,496
AUTOMOBILE VENTILATING DEVICE
Filed July 18, 1935

Inventor
Ross E. Liber
By G. E. Dunstan,
Attorney

Patented Aug. 10, 1937

2,089,496

UNITED STATES PATENT OFFICE 2,089,496

AUTOMOBILE VENTILATING DEVICE

Ross E. Liber, Homeworth, Ohio

Application July 18, 1935, Serial No. 32,011

5 Claims. (Cl. 98—2)

This invention relates to automobile ventilating devices for removing the impure air from the inside of an automobile body by utilizing the exhaust of the engine.

The main object of the invention is to provide a ventilating device of said character, which is simple to manufacture and install, is quiet in operation, and safe against entrance of the exhaust gases into the automobile body.

Another object of the invention is to provide a ventilating device of said character having means of adjustment whereby the proper flow of the exhaust gases through the device may be set according to the various conditions of different automobiles for giving efficient ventilation.

With the above and other objects in view, the invention will be hereinafter fully described with reference to the accompanying drawing, and the novel features thereof will be particularly pointed out in the appended claims.

Figure 1:
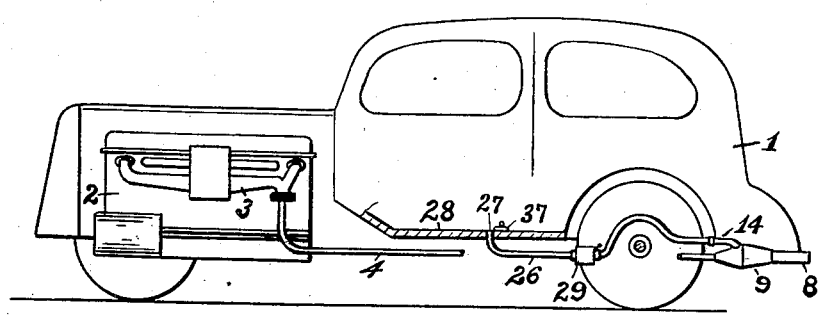
Figure 2:
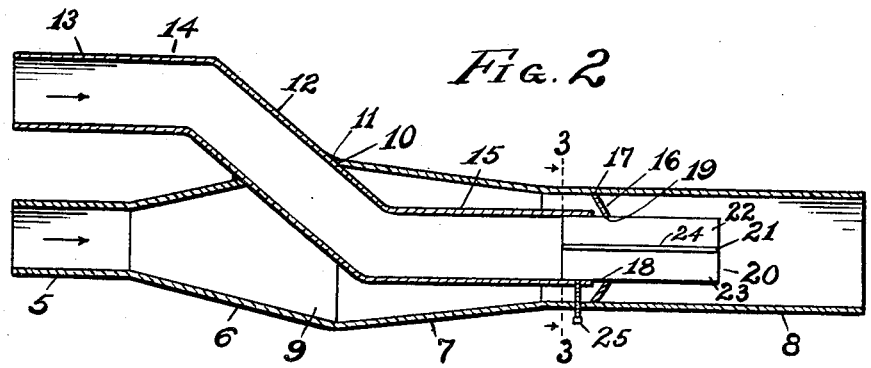
Figure 4:
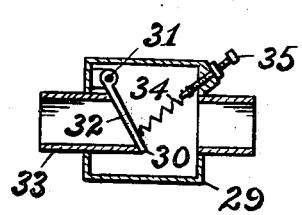
Figure 5:
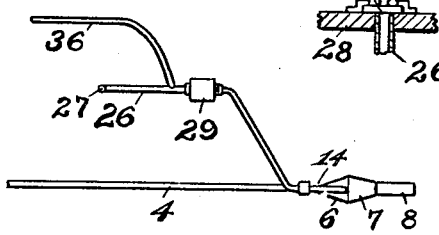
Figure 6:
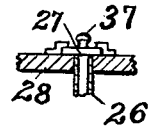
Figure 3:
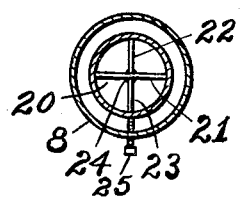

In the drawing, Figure 1 is a view illustrating a ventilating device constructed in accordance with my invention applied to an automobile, Fig. 2 is a longitudinal sectional view of the principal unit of the device, Fig. 3 is a cross sectional view taken on line 3—3 of Fig. 2, Fig. 4 is a longitudinal sectional view of the check-valve box of the suction tube, Fig. 5 is a plan view, on a small scale, of the principal unit and connecting tubes, and Fig. 6 is a sectional elevation of an inlet opening.

Referring to the drawing, I represents the body of an automobile and 2 the engine thereof having the usual exhaust manifold 3 and exhaust pipe 4 leading therefrom. The ventilating device comprises a principal unit consisting of a tubular inlet end 5 of the same diameter as the exhaust pipe 4 to which it is adapted to be welded or connected by any other suitable means. The inlet end 5 tapers outwardly at 6 and then inwardly at 7 to a tubular outlet end 8 having a diameter greater than said inlet end. The oppositely tapering portions at 6 and 7 form an enlarged chamber 9. Passing through an opening 10 of the upper wall of the tapering portion 6 and fixed therein by welding at 11, is the rearwardly and downwardly inclined portion 12 of the inlet end 13 of the suction tube 14. Extending rearwardly from the portion 12 and centrally of the tubular outlet end 8 and terminating a short distance within said outlet end is a rearwardly extending end 15. Arranged in the tubular outlet end 8 at the terminus of the extending end 15 of the suction tube 14 is a diaphragm 16, which is fixed to said outlet end at 17, is annularly inclined rearwardly leaving a space at 18 between same and said outlet end, and is provided with an opening 19 of the same diameter as the inside of said outlet end. Passing through the opening 19 of the disc diaphragm 16 and slidably fitting into the extending end 15 of the suction tube 14 is a longitudinal member 20, which is formed by a horizontal plate 21 and an upper vertical plate 22 and a lower vertical plate 23, all of which are fixed together at their longitudinal center junctures 24. The disc diaphragm 16 serves to direct the exhaust gases passing through the chamber 9 into the center of the outlet end 8 and opposite the end 15 of the suction tube 14 thereby concentrating the pressure at said point for increased efficiency upon the suction action. For directing the exhaust gases and the suction air beyond the disc diaphragm 16 longitudinally through the outlet end 8, the member 20 is employed and is adjustable longitudinally to give maximum suction efficiency and proper ventilating according to the varying power of the engine of different makes of automobiles and other conditions. A set-screw 25, or other suitable means, may be used to hold the member 20 in a proper fixed position.

In order to install the ventilating device, the exhaust pipe 4 is made the proper length after there has been added thereto the ventilating device. The inlet end 5 of the ventilating device is welded to exhaust pipe. Fixed to the inlet end 13 of the suction tube 14 is a hose or other tube 26 leading from an inlet opening as 27 in the floor 28 of the automobile body at any suitable location. For preventing the exhaust gases of the engine entering at the rear end 15 of the exhaust tube 14 and escaping through the inlet opening 27 into the automobile body, a valve box 29 is arranged in the hose or tube 26 and a plate 30 pivoted therein at 31 and adapted to engage the inclined edge 32 of an inlet neck 33 serves as a check-valve. For controlling the opening of the valve 30 according to the exhaust pressure, a coiled spring 34 tends to hold said valve closed, and an adjusting screw 35 is provided for changing said tension of said spring. Similar openings to 27 may be located at any other desirable point or points and tubes as 36 extended therefrom to the suction tube 26, as will be readily understood. The inlet openings as at 27 may be controlled by a sliding cover 37 or other suitable means.

From the description and drawing, it is seen that this ventilating device is adapted for efficient use in connection with the exhaust of the different horse-power engines of the various makes of automobiles and the bodies thereof having different ventilating conditions, that the device is simple to manufacture and install, and that the adjustments provided for adaptation of the device to different makes of automobiles are readily changed and set for a particular automobile.

Having fully described my invention, what I claim is:

1. In a ventilating device for automobiles, the combination with the exhaust pipe of the engine, of an inlet tube, the inlet tube tapering outwardly and then inwardly to form a chamber, a suction tube, the suction tube entering a wall of said chamber and having an outlet end in spaced relation thereto, means in spaced relation to said outlet end of the suction tube for directing the exhaust gases to the center of said outlet end, and means of communication from the body of the automobile to said suction tube.

2. In a ventilating device for automobiles, the combination with the exhaust pipe of the engine, of an inlet tube, the inlet tube tapering outwardly and then inwardly to form a chamber, a suction tube, the suction tube entering the wall of the chamber and having an outlet end in spaced relation thereto, a disc in spaced relation to said outlet end of the suction tube, the disc being provided with an opening opposite said outlet end of the suction tube, and means of communication from the body of the automobile to said suction tube.

3. In a ventilating device for automobiles, the combination with the exhaust pipe of the engine, of an inlet tube, the inlet tube tapering outwardly and then inwardly to form a chamber, a suction tube, the suction tube entering a wall of the chamber and having an outlet end in spaced relation thereto, a disc in spaced relation to said outlet end of the suction tube, the disc being provided with an opening opposite said outlet end of the suction tube, means passing through said opening of the disc and entering said outlet end of the suction tube for directing the exhaust gases and suction air longitudinally, and means of communication from the body of the automobile to said suction tube.

4. In a ventilating device for automobiles, the combination with the exhaust pipe of the engine, of an inlet tube, the inlet tube tapering outwardly and then inwardly to form a chamber, a suction tube, the suction tube entering the wall of the chamber and having an outlet end in spaced relation thereto, a disc in spaced relation to said outlet end of the suction tube, the disc being provided with an opening opposite the outlet end of the suction tube, a member, the member consisting of a horizontal plate and an upper vertical plate and a lower vertical plate fixed together at their longitudinal juncture, the member passing through said opening in said disc and entering said outer end of said suction tube, and means of communication from the body of the automobile to said suction tube.

5. In a ventilating device for automobiles, the combination with the exhaust pipe of the engine, of an inlet tube, the inlet tube tapering outwardly and then inwardly to form a chamber, a suction tube, the suction tube entering a wall of said chamber and having an outlet end in spaced relation thereto, a disc in spaced relation to said outlet end of the suction tube, the disc being provided with an opening opposite said outlet end of the suction tube, a member, the member consisting of a pair of plates forming in a cross section thereof a cross, the member being adjustable through said opening of said disc and in the outlet end of the suction tube, means for fixing said member in a set position, and means establishing communication from the body of the automobile to said suction tube.

ROSS E. LIBER.